US012293612B2

(12) United States Patent
Dong et al.

(10) Patent No.: US 12,293,612 B2
(45) Date of Patent: May 6, 2025

(54) SMART DIGITAL TWIN FOR MONITORING A MACHINE

(71) Applicant: THE BOEING COMPANY, Chicago, IL (US)

(72) Inventors: John J. Dong, Bothell, WA (US); Naveed M. Hussain, Palos Verdes Peninsula, CA (US)

(73) Assignee: The Boeing Company, Arlington, VA (US)

( * ) Notice: Subject to any disclaimer, the term of this patent is extended or adjusted under 35 U.S.C. 154(b) by 311 days.

(21) Appl. No.: 17/649,733

(22) Filed: Feb. 2, 2022

(65) Prior Publication Data

US 2023/0245503 A1 Aug. 3, 2023

(51) Int. Cl.
*G07C 5/00* (2006.01)
*G07C 5/08* (2006.01)

(52) U.S. Cl.
CPC ............ *G07C 5/006* (2013.01); *G07C 5/008* (2013.01); *G07C 5/0808* (2013.01); *G07C 5/0816* (2013.01); *G07C 5/0841* (2013.01)

(58) Field of Classification Search
CPC ...................................................... G07C 5/006
See application file for complete search history.

(56) References Cited

U.S. PATENT DOCUMENTS

| | | | | |
|---|---|---|---|---|
| 7,870,153 B2 * | 1/2011 | Croft | G06F 16/748 709/219 |
| 8,433,672 B2 * | 4/2013 | Shin | G07C 5/0808 706/62 |
| 10,452,062 B2 * | 10/2019 | Smit | G07C 5/0808 |
| 10,643,187 B2 * | 5/2020 | Barkat | G06N 5/04 |
| 11,158,197 B2 * | 10/2021 | Root | G07C 5/0816 |
| 11,752,631 B2 * | 9/2023 | Panigrahi | B60S 5/04 700/245 |
| 2022/0242592 A1 * | 8/2022 | Razakarivony | B64F 5/60 |
| 2022/0365518 A1 * | 11/2022 | Wang | G06F 30/15 |
| 2023/0101183 A1 * | 3/2023 | Cella | G01C 21/3407 701/31.4 |
| 2023/0154240 A1 * | 5/2023 | Browne | G07C 5/085 701/29.4 |
| 2023/0245503 A1 * | 8/2023 | Dong | G07C 5/008 701/29.4 |

OTHER PUBLICATIONS

Digital Twin in Industry: State-of-the-Art (Year: 2019).*

* cited by examiner

*Primary Examiner* — Michael A Berns
(74) *Attorney, Agent, or Firm* — Alleman Hall & Tuttle LLP

(57) ABSTRACT

A method is provided for monitoring a machine that is operable to perform a task. The method includes accessing a smart digital twin (SDT) of an instance of the machine, the SDT including discrete modules for storage of data and logic including models of the machine, requirements of the machine, and maintenance actions for the machine. The method includes performing data analytics on values of operating conditions of the machine to determine a state of the machine, using a model from the models of the machine and the logic. The state of the machine is compared to the requirements, and a maintenance action is identified based on the comparison and to cause a change in the state to maintain the requirements. The data of the SDT is updated to include identification of the maintenance action, and an indication of the maintenance action is output for performance on the machine.

20 Claims, 9 Drawing Sheets

SMART DIGITAL TWIN FOR MONITORING A MACHINE

TECHNOLOGICAL FIELD

The present disclosure relates generally to manufacturing and service of a machine and, in particular, to a smart digital twin for monitoring a machine to identify a maintenance action for the machine.

BACKGROUND

Machines typically undergo scheduled maintenance for repair, update or replacement of component parts to keep the machines in a safe condition for in-service operation. This is particularly true for vehicles such as aircraft, spacecraft, watercraft, motor vehicles and railed vehicles. Performing scheduled maintenance of a machine may capture and fix issues with component parts of the machine, but scheduled maintenance is not always timely with respect to when those issues first arise. In some cases, issues that arise after scheduled maintenance may not be addressed until the next scheduled maintenance is performed. In some cases, these issues lead to greater issues that lead to costlier maintenance, and greater machine downtime during maintenance in which the machine is out of service, and greater maintenance costs.

It would therefore be desirable to have a system and method that takes into account at least some of the issues discussed above, as well as other possible issues.

BRIEF SUMMARY

Example implementations of the present disclosure are directed to present manufacturing and service of a machine and, in particular, to a smart digital twin (SDT) for monitoring a machine to identify a maintenance action for the machine. The SDT of example implementations includes discrete modules for storage of data and logic that may be used to identify maintenance actions to maintain requirements of the machine, and output an indication of the maintenance action for performance of the maintenance action on the machine. The SDT enables one to identify maintenance actions more timely than scheduled maintenance in some cases, which may reduce maintenance costs and machine downtime during maintenance.

The present disclosure thus includes, without limitation, the following example implementations.

Some example implementations provide an apparatus for monitoring a machine that is operable to perform a task, the apparatus comprising: a memory configured to store computer-readable program code; and processing circuitry configured to access the memory, and execute the computer-readable program code to cause the apparatus to at least: access a smart digital twin (SDT) of an instance of the machine, the SDT including discrete modules for storage of data and logic including models of the machine, requirements of the machine, and maintenance actions for the machine; perform data analytics on values of operating conditions of the machine to determine a state of the machine, using a model from the models of the machine and the logic; perform a comparison of the state of the machine to the requirements; identify a maintenance action from the maintenance actions, based on the comparison and to cause a change in the state to maintain the requirements; update the data of the SDT to include identification of the maintenance action; and output an indication of the maintenance action for performance of the maintenance action on the machine.

Some example implementations provide a method of monitoring a machine that is operable to perform a task, the method comprising: accessing a smart digital twin (SDT) of an instance of the machine, the SDT including discrete modules for storage of data and logic including models of the machine, requirements of the machine, and maintenance actions for the machine; performing data analytics on values of operating conditions of the machine to determine a state of the machine, using a model from the models of the machine and the logic; performing a comparison of the state of the machine to the requirements; identifying a maintenance action from the maintenance actions, based on the comparison and to cause a change in the state to maintain the requirements; updating the data of the SDT to include identification of the maintenance action; and outputting an indication of the maintenance action for performance of the maintenance action on the machine.

Some example implementations provide a computer-readable storage medium for monitoring a machine that is operable to perform a task, the computer-readable storage medium being non-transitory and having computer-readable program code stored therein that, in response to execution by processing circuitry, causes an apparatus to at least: access a smart digital twin (SDT) of an instance of the machine, the SDT including discrete modules for storage of data and logic including models of the machine, requirements of the machine, and maintenance actions for the machine; perform data analytics on values of operating conditions of the machine to determine a state of the machine, using a model from the models of the machine and the logic; perform a comparison of the state of the machine to the requirements; identify a maintenance action from the maintenance actions, based on the comparison and to cause a change in the state to maintain the requirements; update the data of the SDT to include identification of the maintenance action; and output an indication of the maintenance action for performance of the maintenance action on the machine.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
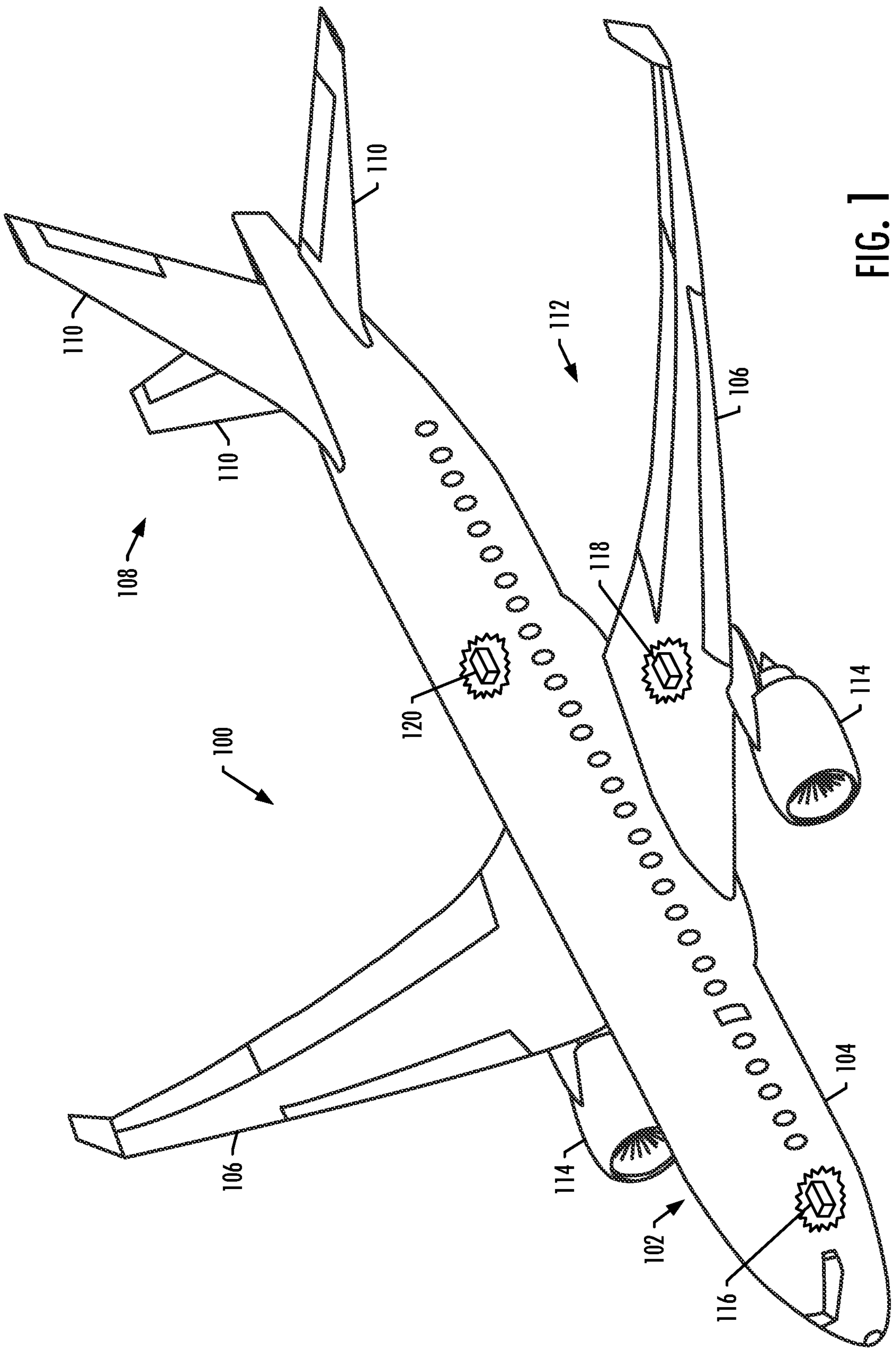
FIG. 1 illustrates one type of vehicle, namely, an aircraft that may benefit from example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to machine engineering and, in particular, to one or more of the design, construction, operation or use of machines such as vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

Figure 2:
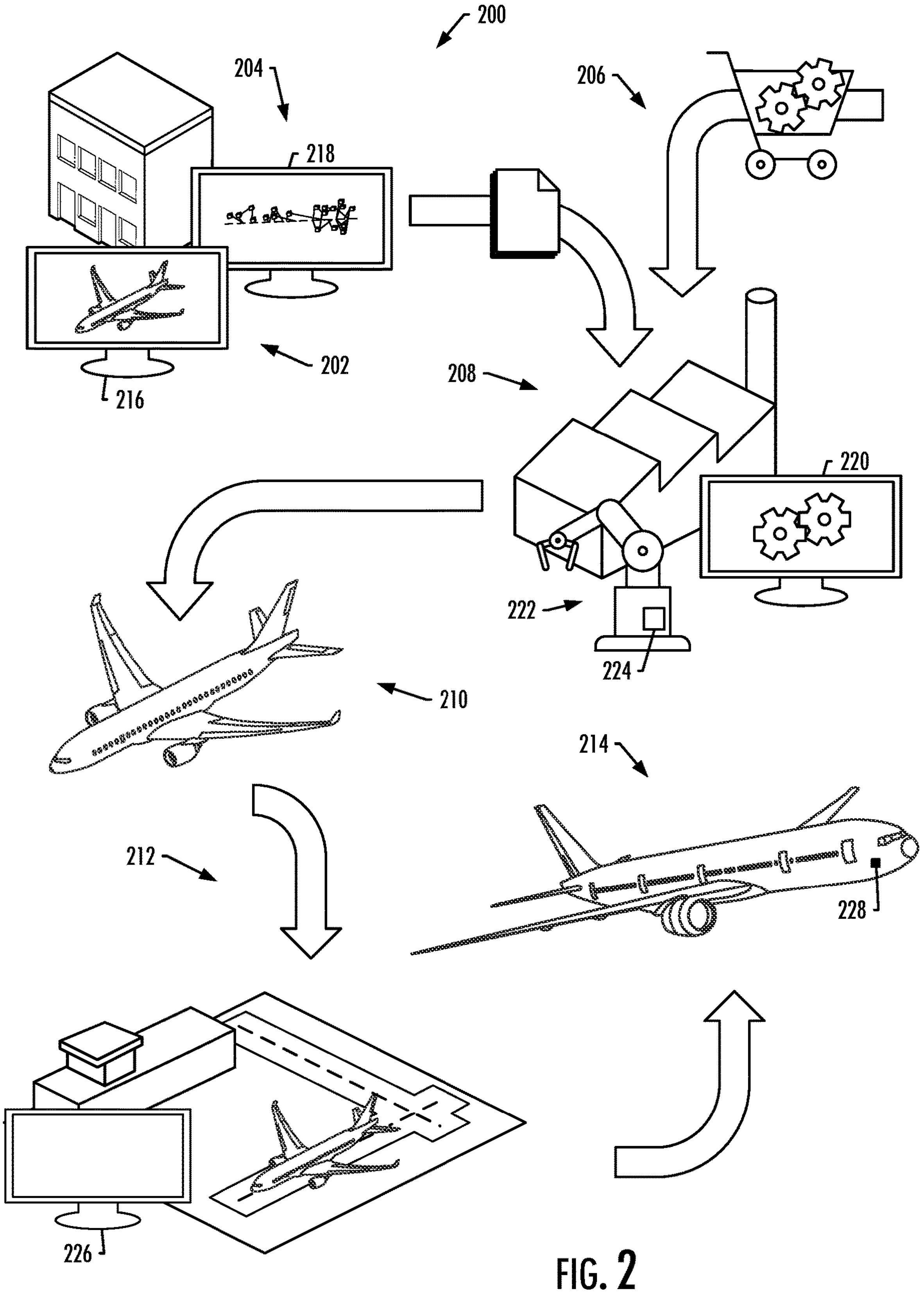
FIG. 2 illustrates an aircraft manufacturing and service method, according to some example implementations.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216, 218, 220, 224, 226, 228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Figure 3:
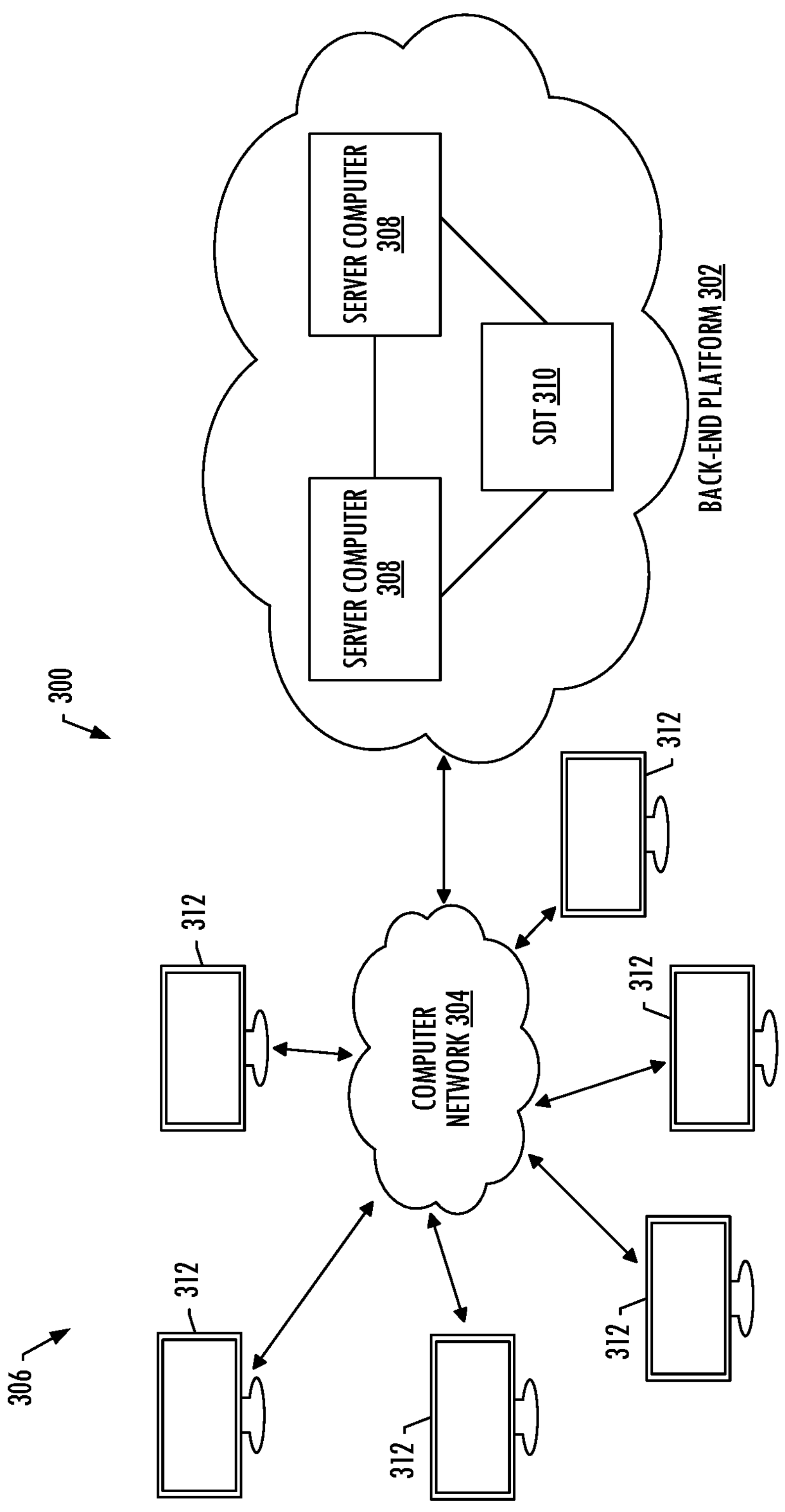
FIG. 3 illustrates a system for monitoring a machine that is operable to perform a task, according to some example implementations.

Example implementations of the present disclosure may be implemented throughout the aircraft manufacturing and service method 200, but are particularly well suited for implementation during any one or more of pre-production, production or in-service. In this regard, FIG. 3 illustrates a system 300 for monitoring a machine that is operable to perform a task, according to some example implementations. In some examples, the machine is an aircraft 100 or a component part or assembly of the aircraft. As shown, the system may be implemented with a cloud computing architecture including one or more of each of a number of elements such as a back-end platform 302, computer network 304 and front-end platform 306, each of which may itself include one or more of each of a number of components. Although shown and described herein in the context of a cloud computing architecture, it should be understood that the system may implemented with any of a number of different network-based architectures.

The back-end platform 302 may include one or more co-located or distributed server computers 308 (each also a "computer"), which may cooperate to provide services of the system 300. This may include the server computers configured to provide access to and perhaps also implement various functionality of at least one smart digital twin (SDT) 310 of at least one instance of the machine (e.g., aircraft 100, component part or assembly). The computer network 304 may connect the back-end platform 302 and front-end platform 306. The computer network may be embodied as one or more wired networks, wireless networks or some combination of wired and wireless networks. The front-end platform 306 may include any number of clients 312 configured to access the services of the system 300 provided by the back-end platform 302 over the network 304. In various examples, the clients are embodied as computers, and any one or more of these computers may correspond to computers 216, 218, 220, 224, 226, 228 used in the method 200. In some examples, then, any one or more of the computers 216, 218, 220, 224, 226, 228 may embody or otherwise function as clients of the system.

According to example implementations of the present disclosure, a client 312 is configured to access and use a SDT 310 of an instance of the machine. The SDT may be accessed through one or more of the server computers 308, which in various examples may also be configured to use the SDT. Examples described below are particular to a client configured to use the SDT; but it should be understood that in other examples, a server computer may be equally configured to access and use the SDT. And in yet other examples, both the client and server computer may cooperate to access and use the SDT.

In examples in which the machine is an aircraft 100 or a component part or assembly of the aircraft, the SDT 310 that is accessed is of an instance of the aircraft or the component part or assembly. The SDT includes discrete modules for storage of data and logic including models of the machine, requirements of the machine, and maintenance actions for the machine. The data may also include models related to operation of the machine, an environment of the machine and the like. Examples of suitable models of the machine include a three-dimensional (3D) geometry model of the machine, at least one simulation model or the like. In some further examples, the at least one simulation model includes at least one physics-based model established based on one or more physical laws, data-driven model established based on historical data, or hybrid physics-based and data-driven model established based on one or more physical laws and supported by historical data.

The client 312 is configured to perform data analytics on values of operating conditions of the machine to determine a state of the machine. In this regard, the client is configured to perform the data analytics using a model from the models of the machine and the logic of the SDT 310, which may include logic for performing the data analytics. In various examples, the values of the operating conditions include observed values measured during operation of the machine to perform the task, and/or predicted values of the operating conditions. In some examples, then, the data analytics is performed on the observed values and the predicted values to determine respectively a current state and a predicted state of the machine that are compared to the requirements.

In examples in which the machine is an aircraft 100 or a component part or assembly of the aircraft, the SDT 310 that is accessed is of an instance of the aircraft or The client 312 is configured to perform a comparison of the state of the machine to the requirements; and the client is configured to identify a maintenance action from the maintenance actions, based on the comparison and to cause a change in the state to maintain the requirements. In various examples, the maintenance action includes a current maintenance action identified based on the comparison of the current state, or a predicted maintenance action identified based on the comparison of the predicted state. The client is configured to update the data of the SDT 310 to include identification of the maintenance action. And the client is configured to output an indication of the maintenance action for performance of the maintenance action on the machine.

As indicated above and described in greater detail below, some example implementations of the present disclosure provide a method to build and use the SDT 310 for monitoring and predicting machine operation and health. In various examples described herein, the SDT is of an instance of a component part or assembly of aircraft 100, such as a landing gear system of the aircraft. It should be understood, however, that the SDT may be for any of a number of other component parts or assemblies of the aircraft or another machine, or the SDT may be for the aircraft or other machine. As also described, in various examples, the SDT may be used onboard the aircraft for realtime (or near realtime) monitoring, or used for post flight simulation and analysis to support predictive maintenance decision making.

Figure 4:
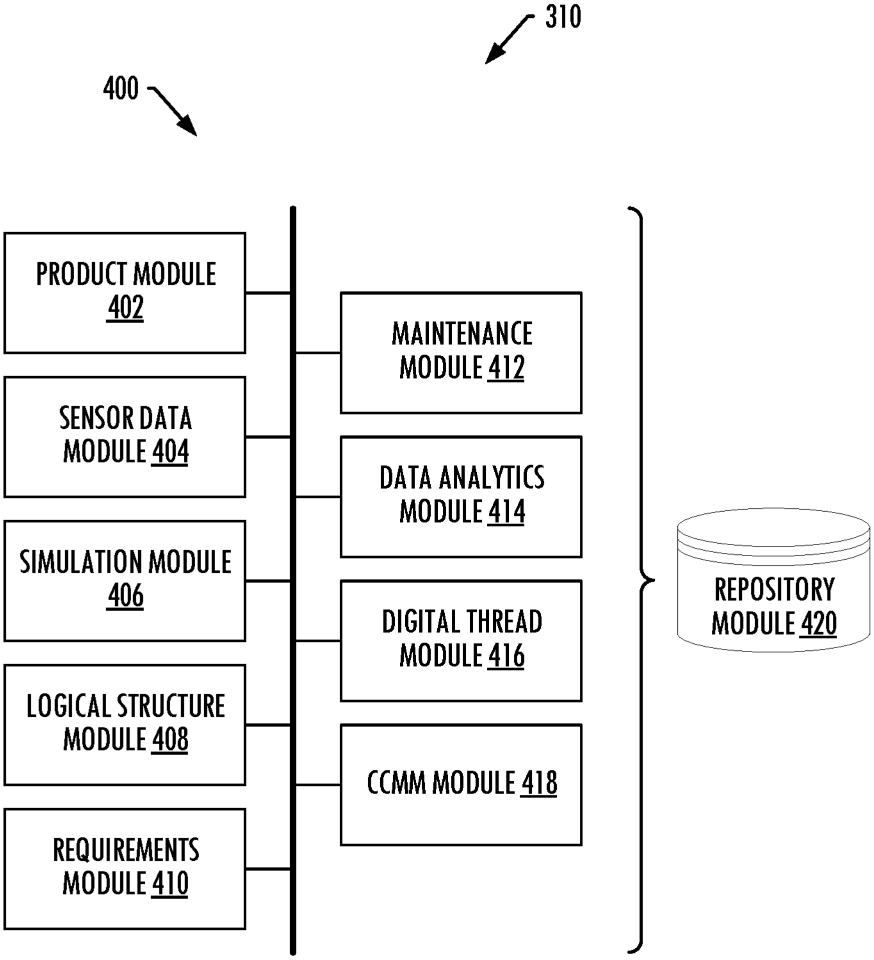
FIG. 4 illustrates a smart digital twin (SDT) according to some example implementations.

FIG. 4 illustrates the SDT 310 including its discrete modules 400 for the storage of data and logic, according to some example implementations. As shown, the discrete modules include one or more of a product module 402, a sensor data module 404, a simulation module 406, a logical structure module 408, a requirements module 410, a maintenance module 412, a data analytics module 414, a digital thread module 416, a configuration and change management (CCMM) module 418, or a repository module 420. It should be understood, however, that the discrete modules may include fewer than all of those shown and described herein, and may include modules in addition to or in lieu of those shown and described herein.

The product module 402 is configured to store the 3D geometry model of the machine. The product module may also be configured to store (or the 3D geometry model may include) information that describes the 3D spatial relationships between various component parts and assemblies of the machine. For the landing gear system of aircraft 100, for example, the product module may be configured to store the 3D geometric model of various landing gear components and assemblies of the landing gear system, and the 3D spatial relationships between those components and assemblies.

The sensor data module 404 is configured to store observed values of operating conditions of the machine measured during operation of the machine to perform a task. In some examples, the sensor data module includes the observed values of the operating conditions measured by sensors located on or in an environment of the machine as the task is performed, which may be obtained by the client 312 and stored in the sensor data module. In some further examples, the sensor data module may also identify the sensors and locations of the sensors. The landing gear system of aircraft 100, for example, may include one or more tire pressure sensors, tire brake temperature sensors, hydraulic pressure sensors, stress/strain sensors, vibration sensors, or camera sensors, and the sensor data module may store observed values the operating conditions measured by these sensors.

The simulation module 406 is configured to store the at least one simulation model that the client 312 may be configured to execute to obtain predicted values of the operating conditions of the machine, and the values of the operating conditions also include the predicted values. The at least one simulation model may include a model of the machine, a model related to operation or an environment of the machine. In this regard, the at least one simulation model may include a machine learning model of cruising air temperature or air pressure. Similarly, the at least one simulation model may include a machine learning model based maintenance records of multiple machines to predict the average life of the machine or a component part or assembly of the machine.

Figure 5:
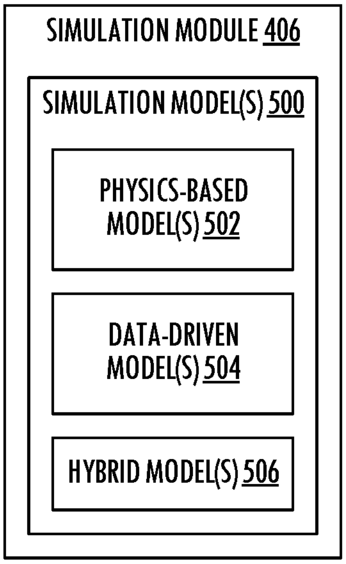
FIG. 5 illustrates a simulation module of the SDT of FIG. 4, according to some example implementations.

As indicated above and shown in FIG. 5, the at least one simulation model 500 may include at least one physics-based model 502, data-driven model 504, or hybrid physics-based and data-driven model 506. A physics-based model is established based on one or more physical laws such as those provided or described by Newton's laws of motion, Navier-Stokes equations, Maxwell's equations and the like. There are a large number of physics-based models that may be used for different purposes. Examples of suitable physics-based models include structure kinematic simulation models, dynamic simulation models, finite element analysis (FEA) models, thermal analysis models, computational fluid dynamics (CFD) models, and electromagnetic analysis models, etc. These and similar models may be used to predict the performance and behavior of the machine under certain boundary conditions.

In a particular example for the landing gear system of aircraft 100, a structure kinematic simulation model may be used to simulate the landing gear system up and down, and the motion of different components and assemblies of the landing gear system during its operation. A dynamic simulation model of landing gear may be used to predict and simulate the landing shimmy. A FEA model of a landing gear stop pad may be used to predict the surface wearing and fatigue damage under repeat impact loads. A CFD model may be used to simulate the air drag due to landing gear. And a CFD model combined with a thermal analysis model may be used to simulate a landing gear brake temperature and ambient ventilation, etc.

A data-driven model 504 is established based on historical data. For example, various machine learning models or surrogate models may be built based on sensor data or maintenance records. These models may be used to predict the performance and behaviors of a machine but without any physics behind it.

A hybrid physics-based and data-driven model 506 is established based on one or more physical laws and supported by historical data. In some examples, a hybrid model may be established based on one or more physical laws and supported by data-driven machine learning (ML) algorithms. This type of model may in some cases provide higher fidelity simulation and prediction, and require fewer computational resources.

The logical structure module 408 is configured to store a logical structure of the machine. In this regard, the logical structure describes a hierarchy of component parts of the machine and relationships between the component parts. In some examples, the client 312 is further configured to generate the at least one simulation model from the 3D geometry model and the logical structure. And in some of these examples, the client is configured to store the at least one simulation model in the simulation module 406 of the SDT 310.

The requirements module 410 is configured to store the requirements of the machine (e.g., aircraft 100, component part or assembly), which may include operation requirements, support requirements and service requirements. These and similar requirements may specify if or when a maintenance action such as a component part repair or replacement is suggested, recommended or required.

The maintenance module 412 is configured to store the maintenance actions for the machine, such as inspection, maintenance, repair and replacement actions for the machine. In some examples, the maintenance module further stores maintenance actions performed on the instance of the machine, and includes links to the maintenance actions performed on other instances of the machine (e.g., other instances of the same landing gear system). The maintenance actions may in some cases include information related to the reasons for the maintenance actions.

The data analytics module 414 is configured to store the logic of the data analytics. This may include logic for performing data analytics on observed values of the operating conditions measured during operation of the machine to perform the task, and predicted values of the operating conditions obtained from execution of a simulation model of the machine. In some examples, the logic of the data analytics stored in the data analytics module further includes logic for validation of the predicted values based on the observed values.

Figure 6:
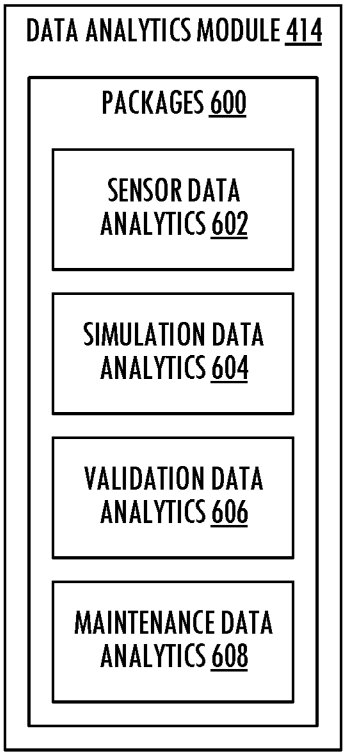
FIG. 6 illustrates a data analytics module of the SDT of FIG. 4, according to some example implementations.

In some more particular examples, the logic of the data analytics may be provided in packages. As shown in FIG. 6, for example, the packages 600 may include one or more of as a sensor data analytics package 602 for data analytics on observed values, a simulation data analytics package 604 for data analytics on predicted values, a validation data analytics package 606 for validation of predicted values, or a maintenance data analytics package 608 for processing maintenance actions.

The sensor data analytics package 602 may provide the capabilities to process and visualize various sensor data to monitor machine operation and health to decide if an immediate inspection and maintenance action is suggested, recommended or required. This package may include various statistical analysis approaches to process sensor data to identify trends, patterns and/or relationships, and to calculate different performance and operation indices to compare with operation and maintenance requirements, etc. The package may also include various machine learning approaches such as Generative Adversarial networks (GANs) for image sensor data processing, Convolutional Neural Networks (CNNs) for time series sensor data processing, and the like.

The simulation data analytics package 604 may provide the capabilities to process and visualize predicted values to predict the performance/behavior of the machine or a portion of the machine, and to calculate different performance and operation indices (similar to the sensor data analytics package) to compare with operation and maintenance requirements to decide if a predictive maintenance is suggested, recommended or required.

The validation data analytics package 606 may provide a number of validation capabilities. These capabilities may include capabilities to improve physics-based models with updated models and boundary conditions from sensor data, and improve data-driven models with additional sensor data. And as indicated above, the validation data analytics package may include the capability to validate predicted values (and thereby simulation models) based on sensor data (observed values).

The maintenance data analytics package 608 may provide the capabilities to process and visualize maintenance records that describe maintenance actions, and other related data. This may include, for example, text data analytics, machine learning for maintenance and failure pattern recognition, etc.

Returning to FIG. 4, the digital thread module 416 is configured to store digital threads to maintain traceability of data and flows across the modules 400. These digital threads may include, for example, an operation digital thread that links the data and logic to the observed values. In some examples, the operation digital thread further links the data and logic to maintenance actions identified from comparison of a current state of the machine to the requirements (in the requirements module 410), and maintenance actions performed on the machine (in the maintenance module 412). Additionally or alternatively, the threads may include a predictive digital thread that links the data and logic to the predicted values; and in some of these examples, the predictive digital thread further links the data and logic to maintenance actions identified from comparison of a predicted state of the machine to the requirements.

In some examples, the client 312 is further configured to update one or more of the models of the machine based on the maintenance action as performed on the machine to generate one or more corresponding derivative models. In some of these examples, the CCMM module 418 is configured to store logic for management of the models and the one or more derivative models.

In some examples, the SDT 310 of the instance of the machine may itself include a baseline SDT and one or more derivative SDTs. The baseline SDT may include baseline discrete modules for storage of data and logic including baselines of the models, requirements and maintenance actions. Derivative SDTs may incorporate updates to one or more of the baseline discrete modules, which in turn may include derivative models, requirements or maintenance actions that incorporate updates to one or more of the models, requirements or maintenance actions. These updates may include a modification, repair or replacement of a component part or assembly made during a maintenance action, which may lead to updates to various ones of the models and perhaps also the logical structure of the machine (in the logical structure module 408). The CCMM module 418, then, may manage the baseline SDT, derivative SDTs and updates.

The repository module 420 that includes further logic for management and coordination of the modules 402-418 in which the data and logic are stored. In some of these examples, the SDT 310 is accessed from cloud storage using the repository module. In this regard, the discrete modules 400 including their data and logic may be stored across multiple server computers 308, but linked together to provide a single authoritative data source for the SDT.

FIGS. 7A-7F are flowcharts illustrating various steps in a method 700 of monitoring a machine that is operable to perform a task, according to various example implementations of the present disclosure. The method includes accessing a smart digital twin (SDT) of an instance of the machine, the SDT including discrete modules for storage of data and logic including models of the machine, requirements of the machine, and maintenance actions for the machine, as shown at block 702 of FIG. 7A. The method includes performing data analytics on values of operating conditions of the machine to determine a state of the machine, using a model from the models of the machine and the logic, as shown at block 704. The method includes performing a comparison of the state of the machine to the requirements, as shown at block 706. The method includes identifying a maintenance action from the maintenance actions, based on the comparison and to cause a change in the state to maintain the requirements, as shown at block 708. The method includes updating the data of the SDT to include identification of the maintenance action, as shown at block 710. And the method includes outputting an indication of the maintenance action for performance of the maintenance action on the machine, as shown at block 712.

In some examples, the machine is an aircraft or a component part or assembly of the aircraft, and the SDT that is accessed at block 702 is of an instance of the aircraft or the component part or assembly.

In some examples, the models of the machine include a three-dimensional (3D) geometry model of the machine, and the values of the operating conditions include observed values measured during operation of the machine to perform the task. In some of these examples, the discrete modules include a product module in which the 3D geometry model is stored, and a sensor data module in which the observed values are stored.

In some examples, the sensor data module includes the observed values of the operating conditions measured by sensors located on or in an environment of the machine as the task is performed, and the sensor data module also identifies the sensors and locations of the sensors.

Figure 7A:
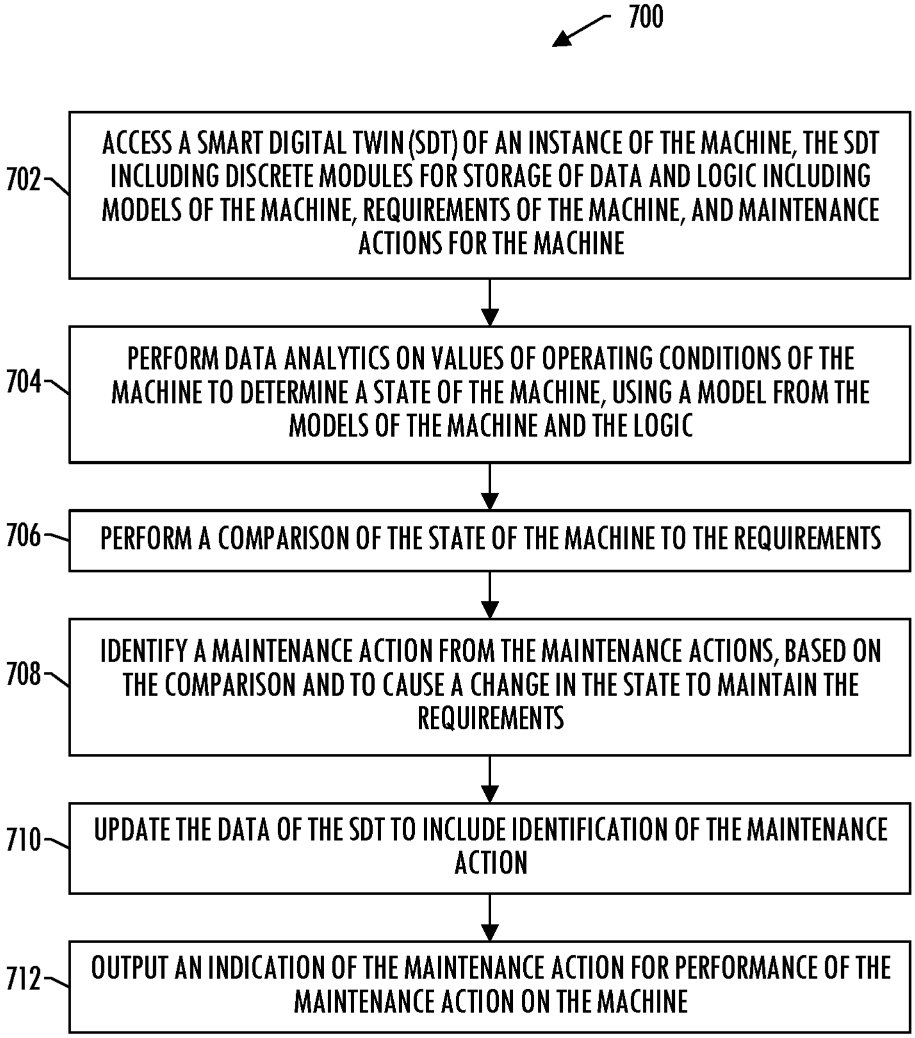
FIGS. 7A, 7B, 7C, 7D, 7E and 7F are flowcharts illustrating various steps in a method of monitoring a machine that is operable to perform a task, according to example implementations.
Figure 7B:
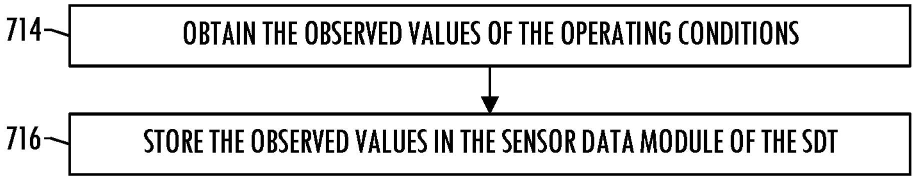
Figure 7C:
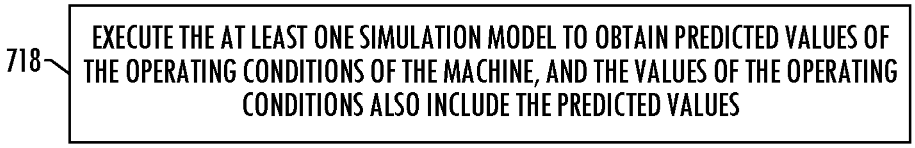
Figure 7D:
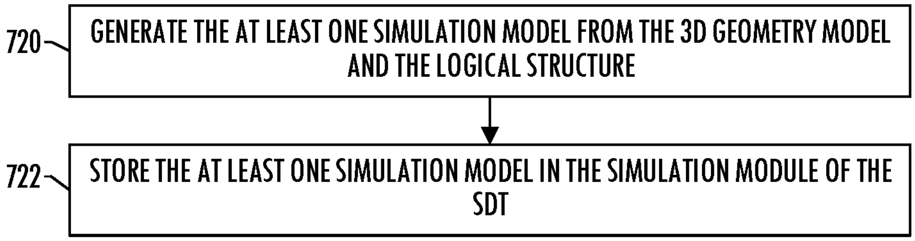
Figure 7E:
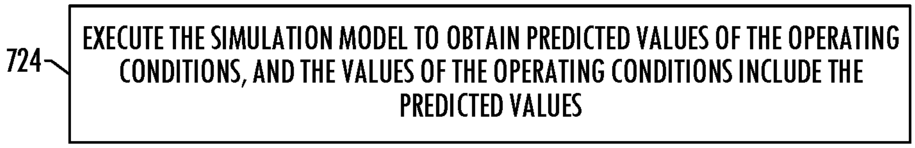

In some examples, the method 700 further includes obtaining the observed values of the operating conditions, as shown at block 714 of FIG. 7B. And the method includes storing the observed values in the sensor data module of the SDT, as shown at block 716.

In some examples, the models also include at least one simulation model, and the discrete modules include a simulation module in which the at least one simulation model is stored. In some of these examples, the method further includes executing the at least one simulation model to obtain predicted values of the operating conditions of the machine, and the values of the operating conditions also include the predicted values, as shown at block 718 of FIG. 7C.

In some examples, the at least one simulation model includes at least one physics-based model established based on one or more physical laws, data-driven model established based on historical data, or hybrid physics-based and data-driven model established based on one or more physical laws and supported by historical data.

In some examples, the discrete modules include a logical structure module in which a logical structure of the machine is stored, the logical structure describing a hierarchy of component parts of the machine and relationships between the component parts. In some of these examples, the method 700 further includes generating the at least one simulation model from the 3D geometry model and the logical structure, as shown at block 720 of FIG. 7D. And the method includes storing the at least one simulation model in the simulation module of the SDT, as shown at block 722.

In some examples, the data analytics is performed at block 704 on the observed values and the predicted values to determine respectively a current state and a predicted state of the machine that are compared to the requirements. In some of these examples, the maintenance action includes a current maintenance action identified based on the comparison of the current state, or a predicted maintenance action identified based on the comparison of the predicted state.

In some examples, the models of the machine include a simulation model of the machine, and the discrete modules include a simulation module in which the simulation model stored. In some of these examples, the method further includes executing the simulation model to obtain predicted values of the operating conditions, and the values of the operating conditions include the predicted values, as shown at block 724 of FIG. 7E.

In some examples, the discrete modules include a requirements module in which the requirements of the machine are stored, and the requirements include operation requirements, support requirements and service requirements.

In some examples, the discrete modules include a maintenance module in which the maintenance actions for the machine are stored, and the maintenance actions include inspection, maintenance, repair and replacement actions for the machine.

In some examples, the maintenance module further stores maintenance actions performed on the instance of the machine, and includes links to the maintenance actions performed on other instances of the machine.

In some examples, the discrete modules include a data analytics module in which the logic of the data analytics is stored, and the logic includes logic for performing data analytics on observed values of the operating conditions measured during operation of the machine to perform the task, and predicted values of the operating conditions obtained from execution of a simulation model of the machine.

In some examples, the logic of the data analytics stored in the data analytics module further includes logic for validation of the predicted values based on the observed values.

In some examples, the values of the operating conditions include observed values measured during operation of the machine to perform the task, and predicted values of the operating conditions obtained from execution of a simulation model of the machine. In some of these examples, the discrete modules include a digital thread module that stores an operation digital thread that links the data and logic to the observed values, and a predictive digital thread that links the data and logic to the predicted values.

In some examples, the operation digital thread further links the data and logic to maintenance actions identified from comparison of a current state of the machine to the requirements, and maintenance actions performed on the machine.

In some examples, the predictive digital thread further links the data and logic to maintenance actions identified from comparison of a predicted state of the machine to the requirements.

Figure 7F:
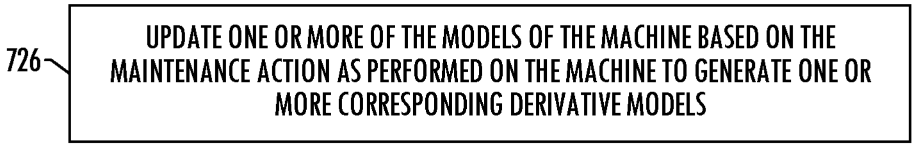

In some examples, the method 700 further includes updating one or more of the models of the machine based on the maintenance action as performed on the machine to generate one or more corresponding derivative models, as shown at block 726 of FIG. 7F. In some of these examples, the discrete modules include a configuration and change management (CCMM) module for storage of logic for management of the models and the one or more derivative models.

In some examples, the SDT further includes a repository module that includes further logic for management and coordination of the modules in which the data and logic are stored, and the SDT is accessed from cloud storage using the repository module.

According to example implementations of the present disclosure, the system 300 and its subsystems including the server computer 308 and client 312 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 8:
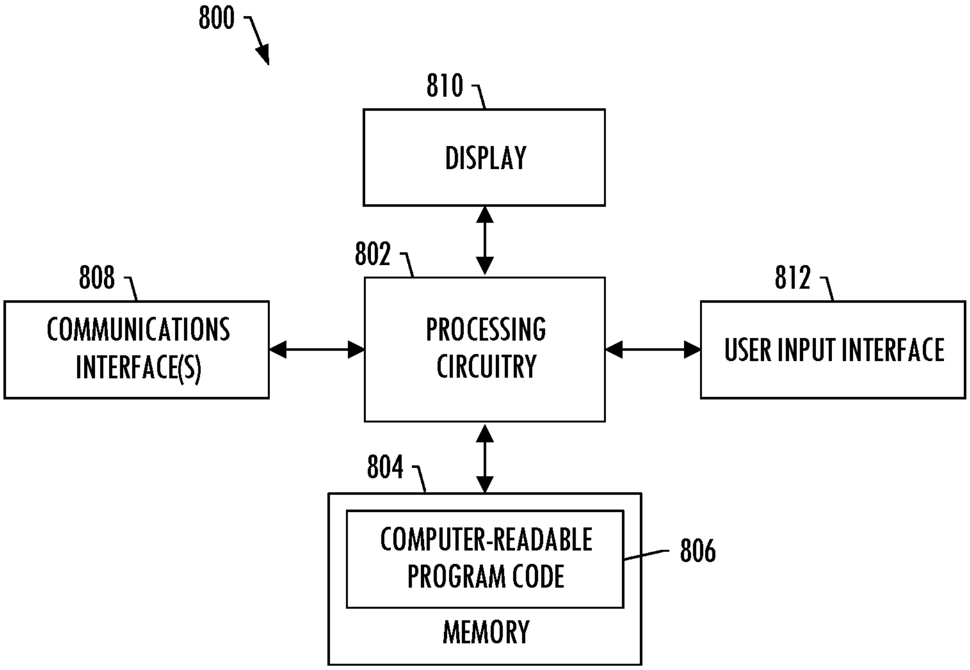
FIG. 8 illustrates an apparatus according to some example implementations.

FIG. 8 illustrates an apparatus 800 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for monitoring a machine that is operable to perform a task, the apparatus comprising: a memory configured to store computer-readable program code; and processing circuitry configured to access the memory, and execute the computer-readable program code to cause the apparatus to at least: access a smart digital twin (SDT) of an instance of the machine, the SDT including discrete modules for storage of data and logic including models of the machine, requirements of the machine, and maintenance actions for the machine; perform data analytics on values of operating conditions of the machine to determine a state of the machine, using a model from the models of the machine and the logic; perform a comparison of the state of the machine to the requirements; identify a maintenance action from the maintenance actions, based on the comparison and to cause a change in the state to maintain the requirements; update the data of the SDT to include identification of the maintenance action; and output an indication of the maintenance action for performance of the maintenance action on the machine.

Clause 2. The apparatus of clause 1, wherein the machine is an aircraft or a component part or assembly of the aircraft, and the SDT that is accessed is of an instance of the aircraft or the component part or assembly.

Clause 3. The apparatus of clause 1 or clause 2, wherein the models of the machine include a three-dimensional (3D) geometry model of the machine, and the values of the operating conditions include observed values measured during operation of the machine to perform the task, and wherein the discrete modules include a product module in which the 3D geometry model is stored, and a sensor data module in which the observed values are stored.

Clause 4. The apparatus of clause 3, wherein the sensor data module includes the observed values of the operating conditions measured by sensors located on or in an environment of the machine as the task is performed, and the sensor data module also identifies the sensors and locations of the sensors.

Clause 5. The apparatus of clause 3 or clause 4, wherein the processing circuitry is configured to execute the computer-readable program code to cause the apparatus to further at least: obtain the observed values of the operating conditions; and store the observed values in the sensor data module of the SDT.

Clause 6. The apparatus of any of clauses 3 to 5, wherein the models also include at least one simulation model, and the discrete modules include a simulation module in which the at least one simulation model is stored, and wherein the processing circuitry is configured to execute the computer-readable program code to cause the apparatus to further execute the at least one simulation model to obtain predicted values of the operating conditions of the machine, and the values of the operating conditions also include the predicted values.

Clause 7. The apparatus of clause 6, wherein the at least one simulation model includes at least one physics-based model established based on one or more physical laws, data-driven model established based on historical data, or hybrid physics-based and data-driven model established based on one or more physical laws and supported by historical data.

Clause 8. The apparatus of clause 6 or clause 7, wherein the discrete modules include a logical structure module in which a logical structure of the machine is stored, the logical structure describing a hierarchy of component parts of the machine and relationships between the component parts, and wherein the processing circuitry is configured to execute the computer-readable program code to cause the apparatus to further at least: generate the at least one simulation model from the 3D geometry model and the logical structure; and store the at least one simulation model in the simulation module of the SDT.

Clause 9. The apparatus of any of clauses 6 to 8, wherein the data analytics is performed on the observed values and the predicted values to determine respectively a current state and a predicted state of the machine that are compared to the requirements, and wherein the maintenance action includes a current maintenance action identified based on the comparison of the current state, or a predicted maintenance action identified based on the comparison of the predicted state.

Clause 10. The apparatus of any of clauses 1 to 9, wherein the models of the machine include a simulation model of the machine, and the discrete modules include a simulation module in which the simulation model stored, and wherein the processing circuitry is configured to execute the computer-readable program code to cause the apparatus to further execute the simulation model to obtain predicted values of the operating conditions, and the values of the operating conditions include the predicted values.

Clause 11. The apparatus of any of clauses 1 to 10, wherein the discrete modules include a requirements module in which the requirements of the machine are stored, and the requirements include operation requirements, support requirements and service requirements.

Clause 12. The apparatus of any of clauses 1 to 11, wherein the discrete modules include a maintenance module in which the maintenance actions for the machine are stored, and the maintenance actions include inspection, maintenance, repair and replacement actions for the machine.

Clause 13. The apparatus of clause 12, wherein the maintenance module further stores maintenance actions performed on the instance of the machine, and includes links to the maintenance actions performed on other instances of the machine.

Clause 14. The apparatus of any of clauses 1 to 13, wherein the discrete modules include a data analytics module in which the logic of the data analytics is stored, and the logic includes logic for performing data analytics on observed values of the operating conditions measured during operation of the machine to perform the task, and predicted values of the operating conditions obtained from execution of a simulation model of the machine.

Clause 15. The apparatus of clause 14, wherein the logic of the data analytics stored in the data analytics module further includes logic for validation of the predicted values based on the observed values.

Clause 16. The apparatus of any of clauses 1 to 15, wherein the values of the operating conditions include observed values measured during operation of the machine to perform the task, and predicted values of the operating conditions obtained from execution of a simulation model of the machine, and wherein the discrete modules include a digital thread module that stores an operation digital thread that links the data and logic to the observed values, and a predictive digital thread that links the data and logic to the predicted values.

Clause 17. The apparatus of clause 16, wherein the operation digital thread further links the data and logic to maintenance actions identified from comparison of a current state of the machine to the requirements, and maintenance actions performed on the machine.

Clause 18. The apparatus of clause 16 or clause 17, wherein the predictive digital thread further links the data and logic to maintenance actions identified from comparison of a predicted state of the machine to the requirements.

Clause 19. The apparatus of any of clauses 1 to 18, wherein the processing circuitry is configured to execute the computer-readable program code to cause the apparatus to further update one or more of the models of the machine based on the maintenance action as performed on the machine to generate one or more corresponding derivative models, and wherein the discrete modules include a configuration and change management (CCMM) module for storage of logic for management of the models and the one or more derivative models.

Clause 20. The apparatus of any of clauses 1 to 19, wherein the SDT further includes a repository module that includes further logic for management and coordination of the modules in which the data and logic are stored, and the SDT is accessed from cloud storage using the repository module.

Clause 21. A method of monitoring a machine that is operable to perform a task, the method comprising: accessing a smart digital twin (SDT) of an instance of the machine, the SDT including discrete modules for storage of data and logic including models of the machine, requirements of the machine, and maintenance actions for the machine; performing data analytics on values of operating conditions of the machine to determine a state of the machine, using a model from the models of the machine and the logic; performing a comparison of the state of the machine to the requirements; identifying a maintenance action from the maintenance actions, based on the comparison and to cause a change in the state to maintain the requirements; updating the data of the SDT to include identification of the maintenance action; and outputting an indication of the maintenance action for performance of the maintenance action on the machine.

Clause 22. The method of clause 21, wherein the machine is an aircraft or a component part or assembly of the aircraft, and the SDT that is accessed is of an instance of the aircraft or the component part or assembly.

Clause 23. The method of clause 21 or clause 22, wherein the models of the machine include a three-dimensional (3D) geometry model of the machine, and the values of the operating conditions include observed values measured during operation of the machine to perform the task, and wherein the discrete modules include a product module in which the 3D geometry model is stored, and a sensor data module in which the observed values are stored.

Clause 24. The method of clause 23, wherein the sensor data module includes the observed values of the operating conditions measured by sensors located on or in an environment of the machine as the task is performed, and the sensor data module also identifies the sensors and locations of the sensors.

Clause 25. The method of clause 23 or clause 24, wherein the method further comprises: obtaining the observed values of the operating conditions; and storing the observed values in the sensor data module of the SDT.

Clause 26. The method of any of clauses 23 to 25, wherein the models also include at least one simulation model, and the discrete modules include a simulation module in which the at least one simulation model is stored, and wherein the method further comprises executing the at least one simulation model to obtain predicted values of the operating conditions of the machine, and the values of the operating conditions also include the predicted values.

Clause 27. The method of clause 26, wherein the at least one simulation model includes at least one physics-based model established based on one or more physical laws, data-driven model established based on historical data, or hybrid physics-based and data-driven model established based on one or more physical laws and supported by historical data.

Clause 28. The method of clause 26 or clause 27, wherein the discrete modules include a logical structure module in which a logical structure of the machine is stored, the logical structure describing a hierarchy of component parts of the machine and relationships between the component parts, and wherein the method further comprises: generating the at least one simulation model from the 3D geometry model and the logical structure; and storing the at least one simulation model in the simulation module of the SDT.

Clause 29. The method of any of clauses 26 to 28, wherein the data analytics is performed on the observed values and the predicted values to determine respectively a current state and a predicted state of the machine that are compared to the requirements, and wherein the maintenance action includes a current maintenance action identified based on the comparison of the current state, or a predicted maintenance action identified based on the comparison of the predicted state.

Clause 30. The method of any of clauses 21 to 29, wherein the models of the machine include a simulation model of the machine, and the discrete modules include a simulation module in which the simulation model stored, and wherein the method further comprises executing the simulation model to obtain predicted values of the operating conditions, and the values of the operating conditions include the predicted values.

Clause 31. The method of any of clauses 21 to 30, wherein the discrete modules include a requirements module in which the requirements of the machine are stored, and the requirements include operation requirements, support requirements and service requirements.

Clause 32. The method of any of clauses 21 to 31, wherein the discrete modules include a maintenance module in which the maintenance actions for the machine are stored, and the maintenance actions include inspection, maintenance, repair and replacement actions for the machine.

Clause 33. The method of clause 32, wherein the maintenance module further stores maintenance actions performed on the instance of the machine, and includes links to the maintenance actions performed on other instances of the machine.

Clause 34. The method of any of clauses 21 to 33, wherein the discrete modules include a data analytics module in which the logic of the data analytics is stored, and the logic includes logic for performing data analytics on observed values of the operating conditions measured during operation of the machine to perform the task, and predicted values of the operating conditions obtained from execution of a simulation model of the machine.

Clause 35. The method of clause 34, wherein the logic of the data analytics stored in the data analytics module further includes logic for validation of the predicted values based on the observed values.

Clause 36. The method of any of clauses 21 to 35, wherein the values of the operating conditions include observed values measured during operation of the machine to perform the task, and predicted values of the operating conditions obtained from execution of a simulation model of the machine, and wherein the discrete modules include a digital thread module that stores an operation digital thread that links the data and logic to the observed values, and a predictive digital thread that links the data and logic to the predicted values.

Clause 37. The method of clause 36, wherein the operation digital thread further links the data and logic to maintenance actions identified from comparison of a current state of the machine to the requirements, and maintenance actions performed on the machine.

Clause 38. The method of clause 36 or clause 37, wherein the predictive digital thread further links the data and logic to maintenance actions identified from comparison of a predicted state of the machine to the requirements.

Clause 39. The method of any of clauses 21 to 38, wherein the method further comprises updating one or more of the models of the machine based on the maintenance action as performed on the machine to generate one or more corresponding derivative models, and wherein the discrete modules include a configuration and change management (CCMM) module for storage of logic for management of the models and the one or more derivative models.

Clause 40. The method of any of clauses 21 to 39, wherein the SDT further includes a repository module that includes further logic for management and coordination of the modules in which the data and logic are stored, and the SDT is accessed from cloud storage using the repository module.

Clause 41. A computer-readable storage medium for monitoring a machine that is operable to perform a task, the computer-readable storage medium being non-transitory and having computer-readable program code stored therein that, in response to execution by processing circuitry, causes an apparatus to at least: access a smart digital twin (SDT) of an instance of the machine, the SDT including discrete modules for storage of data and logic including models of the machine, requirements of the machine, and maintenance actions for the machine; perform data analytics on values of operating conditions of the machine to determine a state of the machine, using a model from the models of the machine and the logic; perform a comparison of the state of the machine to the requirements; identify a maintenance action from the maintenance actions, based on the comparison and to cause a change in the state to maintain the requirements; update the data of the SDT to include identification of the maintenance action; and output an indication of the maintenance action for performance of the maintenance action on the machine.

Clause 42. The computer-readable storage medium of clause 41, wherein the machine is an aircraft or a component part or assembly of the aircraft, and the SDT that is accessed is of an instance of the aircraft or the component part or assembly.

Clause 43. The computer-readable storage medium of clause 41 or clause 42, wherein the models of the machine include a three-dimensional (3D) geometry model of the machine, and the values of the operating conditions include observed values measured during operation of the machine to perform the task, and wherein the discrete modules include a product module in which the 3D geometry model is stored, and a sensor data module in which the observed values are stored.

Clause 44. The computer-readable storage medium of clause 43, wherein the sensor data module includes the observed values of the operating conditions measured by sensors located on or in an environment of the machine as the task is performed, and the sensor data module also identifies the sensors and locations of the sensors.

Clause 45. The computer-readable storage medium of clause 43 or clause 44, wherein the computer-readable storage medium has further computer-readable program code stored therein that, in response to execution by the processing circuitry, causes the apparatus to further at least: obtain the observed values of the operating conditions; and store the observed values in the sensor data module of the SDT.

Clause 46. The computer-readable storage medium of any of clauses 43 to 45, wherein the models also include at least one simulation model, and the discrete modules include a simulation module in which the at least one simulation model is stored, and wherein the computer-readable storage medium has further computer-readable program code stored therein that, in response to execution by the processing circuitry, causes the apparatus to further execute the at least one simulation model to obtain predicted values of the operating conditions of the machine, and the values of the operating conditions also include the predicted values.

Clause 47. The computer-readable storage medium of clause 46, wherein the at least one simulation model includes at least one physics-based model established based on one or more physical laws, data-driven model established based on historical data, or hybrid physics-based and data-driven model established based on one or more physical laws and supported by historical data.

Clause 48. The computer-readable storage medium of clause 46 or clause 47, wherein the discrete modules include a logical structure module in which a logical structure of the machine is stored, the logical structure describing a hierarchy of component parts of the machine and relationships between the component parts, and wherein the computer-readable storage medium has further computer-readable program code stored therein that, in response to execution by the processing circuitry, causes the apparatus to further at least: generate the at least one simulation model from the 3D geometry model and the logical structure; and store the at least one simulation model in the simulation module of the SDT.

Clause 49. The computer-readable storage medium of any of clauses 46 to 48, wherein the data analytics is performed on the observed values and the predicted values to determine respectively a current state and a predicted state of the machine that are compared to the requirements, and wherein the maintenance action includes a current maintenance action identified based on the comparison of the current state, or a predicted maintenance action identified based on the comparison of the predicted state.

Clause 50. The computer-readable storage medium of any of clauses 41 to 49, wherein the models of the machine include a simulation model of the machine, and the discrete modules include a simulation module in which the simulation model stored, and wherein the computer-readable storage medium has further computer-readable program code stored therein that, in response to execution by the processing circuitry, causes the apparatus to further execute the simulation model to obtain predicted values of the operating conditions, and the values of the operating conditions include the predicted values.

Clause 51. The computer-readable storage medium of any of clauses 41 to 50, wherein the discrete modules include a requirements module in which the requirements of the machine are stored, and the requirements include operation requirements, support requirements and service requirements.

Clause 52. The computer-readable storage medium of any of clauses 41 to 51, wherein the discrete modules include a maintenance module in which the maintenance actions for the machine are stored, and the maintenance actions include inspection, maintenance, repair and replacement actions for the machine.

Clause 53. The computer-readable storage medium of clause 52, wherein the maintenance module further stores maintenance actions performed on the instance of the machine, and includes links to the maintenance actions performed on other instances of the machine.

Clause 54. The computer-readable storage medium of any of clauses 41 to 53, wherein the discrete modules include a data analytics module in which the logic of the data analytics is stored, and the logic includes logic for performing data analytics on observed values of the operating conditions measured during operation of the machine to perform the task, and predicted values of the operating conditions obtained from execution of a simulation model of the machine.

Clause 55. The computer-readable storage medium of clause 54, wherein the logic of the data analytics stored in the data analytics module further includes logic for validation of the predicted values based on the observed values.

Clause 56. The computer-readable storage medium of any of clauses 41 to 55, wherein the values of the operating conditions include observed values measured during operation of the machine to perform the task, and predicted values of the operating conditions obtained from execution of a simulation model of the machine, and wherein the discrete modules include a digital thread module that stores an operation digital thread that links the data and logic to the observed values, and a predictive digital thread that links the data and logic to the predicted values.

Clause 57. The computer-readable storage medium of clause 56, wherein the operation digital thread further links the data and logic to maintenance actions identified from comparison of a current state of the machine to the requirements, and maintenance actions performed on the machine.

Clause 58. The computer-readable storage medium of clause 56 or clause 57, wherein the predictive digital thread further links the data and logic to maintenance actions identified from comparison of a predicted state of the machine to the requirements.

Clause 59. The computer-readable storage medium of any of clauses 41 to 58, wherein the computer-readable storage medium has further computer-readable program code stored therein that, in response to execution by the processing circuitry, causes the apparatus to further update one or more of the models of the machine based on the maintenance action as performed on the machine to generate one or more corresponding derivative models, and wherein the discrete modules include a configuration and change management (CCMM) module for storage of logic for management of the models and the one or more derivative models.

Clause 60. The computer-readable storage medium of any of clauses 41 to 59, wherein the SDT further includes a repository module that includes further logic for management and coordination of the modules in which the data and logic are stored, and the SDT is accessed from cloud storage using the repository module.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for monitoring a machine that is operable to perform a task, the apparatus comprising:

a memory configured to store computer-readable program code; and processing circuitry configured to access the memory, and execute the computer-readable program code to cause the apparatus to at least:

access a smart digital twin (SDT) of an instance of the machine, the SDT including discrete modules for storage of data and logic including models of the machine, requirements of the machine, and maintenance actions for the machine, wherein the models of the machine include a three-dimensional (3D) geometry model of the machine;

generate a simulation model using at least the 3D geometry model of the machine, wherein the simulation model comprises one or more of a physics-based model, a historical data model, or a hybrid physics-based and historical data model;

perform data analytics on values of operating conditions of the machine to determine a state of the machine, using at least the generated simulation model and the logic;

perform a comparison of the state of the machine to the requirements of the machine;

identify a maintenance action from the maintenance actions, based on the comparison and to cause a change in the state to maintain the requirements of the machine;

update the data of the SDT to include identification of the maintenance action;

update one or more of the models of the machine based on the maintenance action to include one or more of a modification, a repair, or a replacement of a component part associated with the maintenance action; and output an indication of the maintenance action for performance of the maintenance action on the machine.

2. The apparatus of claim 1, wherein the values of the operating conditions include observed values measured during operation of the machine to perform the task, and wherein the discrete modules include a product module in which the 3D geometry model is stored, and a sensor data module in which the observed values are stored.

3. The apparatus of claim 2, wherein the discrete modules include a simulation module in which the simulation model is stored, and wherein the processing circuitry is configured to execute the computer-readable program code to cause the apparatus to further execute the simulation model to obtain predicted values of the operating conditions of the machine, and wherein the values of the operating conditions of the machine include the predicted values.

4. The apparatus of claim 1, wherein the discrete modules include a simulation module in which the simulation model stored, and wherein the processing circuitry is configured to execute the computer-readable program code to cause the apparatus to further execute the simulation model to obtain predicted values of the operating conditions, and the values of the operating conditions include the predicted values.

5. The apparatus of claim 1, wherein the discrete modules include a requirements module in which the requirements of the machine are stored, and wherein the requirements of the machine include operation requirements, support requirements and service requirements.

6. The apparatus of claim 1, wherein the discrete modules include a maintenance module in which the maintenance actions for the machine are stored, and the maintenance actions include inspection, maintenance, repair and replacement actions for the machine.

7. The apparatus of claim 1, wherein the discrete modules include a data analytics module in which the logic of the data analytics is stored, and the logic includes logic for performing data analytics on observed values of the operating conditions measured during operation of the machine to perform the task, and predicted values of the operating conditions obtained from execution of the simulation model of the machine.

8. The apparatus of claim 1, wherein the values of the operating conditions include observed values measured during operation of the machine to perform the task, and predicted values of the operating conditions obtained from execution of the simulation model of the machine, and wherein the discrete modules include a digital thread module that stores an operation digital thread that links the data and logic to the observed values, and a predictive digital thread that links the data and logic to the predicted values.

9. The apparatus of claim 1, wherein updating one or more of the models of the machine based on the maintenance action as performed on the machine generates one or more corresponding derivative models, and wherein the discrete modules include a configuration and change management (CCMM) module for storage of logic for management of the models and the one or more derivative models.

10. The apparatus of claim 1, wherein the SDT further includes a repository module that includes further logic for management and coordination of the discrete modules in which the data and logic are stored, and the SDT is accessed from cloud storage using the repository module.

11. A method of monitoring a machine that is operable to perform a task, the method comprising:

accessing a smart digital twin (SDT) of an instance of the machine, the SDT including discrete modules for storage of data and logic including models of the machine, requirements of the machine, and maintenance actions for the machine, wherein the models of the machine include a three-dimensional (3D) geometry model of the machine;

generating a simulation model using at least the 3D geometry model of the machine, wherein the simulation model comprises one or more of a physics-based model, a historical data model, or a hybrid physics-based and historical data model;

performing data analytics on values of operating conditions of the machine to determine a state of the machine, using at least the generated simulation model and the logic;

performing a comparison of the state of the machine to the requirements of the machine;

identifying a maintenance action from the maintenance actions, based on the comparison and to cause a change in the state to maintain the requirements of the machine;

updating the data of the SDT to include identification of the maintenance action;

updating one or more of the models of the machine based on the maintenance action to include one or more of a modification, a repair, or a replacement of a component part associated with the maintenance action; and outputting an indication of the maintenance action for performance of the maintenance action on the machine.

12. The method of claim 11, wherein the values of the operating conditions include observed values measured during operation of the machine to perform the task, and wherein the discrete modules include a product module in which the 3D geometry model is stored, and a sensor data module in which the observed values are stored.

13. The method of claim 12, wherein the discrete modules include a simulation module in which the simulation model is stored, and wherein the method further comprises executing the simulation model to obtain predicted values of the operating conditions of the machine, and wherein the values of the operating conditions of the machine include the predicted values.

14. The method of claim 11, wherein the discrete modules include a simulation module in which the simulation model stored, and wherein the method further comprises executing the simulation model to obtain predicted values of the operating conditions, and the values of the operating conditions include the predicted values.

15. The method of claim 11, wherein the discrete modules include a requirements module in which the requirements of the machine are stored, and the requirements of the machine include operation requirements, support requirements and service requirements.

16. The method of claim 11, wherein the discrete modules include a maintenance module in which the maintenance actions for the machine are stored, and the maintenance actions include inspection, maintenance, repair and replacement actions for the machine.

17. The method of claim 11, wherein the discrete modules include a data analytics module in which the logic of the data analytics is stored, and the logic includes logic for performing data analytics on observed values of the operating conditions measured during operation of the machine to perform the task, and predicted values of the operating conditions obtained from execution of the simulation model of the machine.

18. The method of claim 11, wherein the values of the operating conditions include observed values measured during operation of the machine to perform the task, and predicted values of the operating conditions obtained from execution of the simulation model of the machine, and wherein the discrete modules include a digital thread module that stores an operation digital thread that links the data and logic to the observed values, and a predictive digital thread that links the data and logic to the predicted values.

19. The method of claim 11, wherein updating one or more of the models of the machine based on the maintenance action as performed on the machine generates one or more corresponding derivative models, and wherein the discrete modules include a configuration and change management (CCMM) module for storage of logic for management of the models and the one or more derivative models.

20. A non-transitory computer-readable storage medium for monitoring a machine that is operable to perform a task, the computer-readable storage medium being non-transitory and having computer-readable program code stored therein that, in response to execution by processing circuitry, causes an apparatus to at least:

access a smart digital twin (SDT) of an instance of the machine, the SDT including discrete modules for storage of data and logic including models of the machine, requirements of the machine, and maintenance actions for the machine, wherein the models of the machine include a three-dimensional (3D) geometry model of the machine;

generate a simulation model using at least the 3D geometry model of the machine, wherein the simulation model comprises one or more of a physics-based model, a historical data model, or a hybrid physics-based and historical data model;

perform data analytics on values of operating conditions of the machine to determine a state of the machine, using at least the generated simulation model and the logic;

perform a comparison of the state of the machine to the requirements of the machine;

identify a maintenance action from the maintenance actions, based on the comparison and to cause a change in the state to maintain the requirements of the machine;

update the data of the SDT to include identification of the maintenance action;

update one or more of the models of the machine based on the maintenance action to include one or more of a modification, a repair, or a replacement of a component part associated with the maintenance action; and output an indication of the maintenance action for performance of the maintenance action on the machine.

* * * * *